(12) United States Patent
Case et al.

(10) Patent No.: US 8,469,443 B2
(45) Date of Patent: Jun. 25, 2013

(54) REMOVABLE CAB FLOOR ACCESS PANEL

(75) Inventors: Michael David Case, Elmwood, IL (US); Kenneth Michael Weiler, Dunlap, IL (US); Jason Lee Shelby, E. Peoria, IL (US); Jeffrey Alan Zurinski, Oglesby, IL (US)

(73) Assignee: Caterpillar Inc., Peoria, IL (US)

( * ) Notice: Subject to any disclaimer, the term of this patent is extended or adjusted under 35 U.S.C. 154(b) by 89 days.

(21) Appl. No.: 13/173,614

(22) Filed: Jun. 30, 2011

(65) Prior Publication Data
US 2013/0001983 A1 Jan. 3, 2013

(51) Int. Cl.
*B60N 99/00* (2006.01)

(52) U.S. Cl.
USPC .................................................. 296/190.11

(58) Field of Classification Search
USPC ............... 296/190.11, 190.01, 190.08, 202, 296/97.23, 1.03; 180/89.12, 89.16, 89.18, 180/89.19; 49/501
See application file for complete search history.

(56) References Cited

U.S. PATENT DOCUMENTS

| 932,113 | A | 8/1909 | Field, Jr. |
| 5,327,988 | A | 7/1994 | Lenz et al. |
| 6,866,332 | B2 * | 3/2005 | Takeuchi et al. ......... 296/190.11 |
| 2004/0217630 | A1 * | 11/2004 | Takeuchi et al. ......... 296/190.11 |

FOREIGN PATENT DOCUMENTS

| JP | 2010162988 | 7/2010 |
| KR | 100513545 | 9/2005 |

* cited by examiner

*Primary Examiner* — Lori Lyjak
(74) *Attorney, Agent, or Firm* — Leonard Stewart

(57) ABSTRACT

A machine including a chassis, in which an engine is supported on the chassis. The engine includes serviceable components which require servicing. A cab is mounted on the chassis, such that the cab is disposed over the engine. The cab includes a roof and a floor, interconnected through the sidewalls to define an enclosure. The floor is disposed above the engine. Further, the cab includes a floor opening defined in the floor. An access panel is removably coupled to the floor opening. The floor opening provides an access to the serviceable components by removing the access panel.

16 Claims, 4 Drawing Sheets

REMOVABLE CAB FLOOR ACCESS PANEL

TECHNICAL FIELD

The present disclosure relates to a cab design for a machine and more particularly to a removable access panel in a cab floor.

BACKGROUND

Machines having an engine situated under a cab are well known. These machines offer some advantages over conventional machines, such as shorter overall length and improved maneuverability. However, in order to access the engine for servicing the cab needs to be removed or tilted, which is time and labor intensive.

U.S. Pat. No. 932,113 (the '113 patent) discloses a vehicle having a propelling engine beneath a floor. The '113 patent discloses a foot-warmer placed over a floor section in the vehicle. The floor sections are reached by selectively switching the foot-warmer to an inoperative condition and then by raising or moving the foot-warmer aside. The floor section is thus removed for accessing the propelling engine.

SUMMARY

In an aspect, the present disclosure relates to a machine including a chassis. The machine further includes an engine supported on the chassis. The engine includes serviceable components which may need to be accessed for servicing. The machine also includes a cab mounted on the chassis. The cab includes a floor disposed above the engine. The floor includes a floor opening defined above the engine. Further, an access panel is removably coupled to the floor opening in the floor.

Other features and aspects of present disclosure will be apparent from the following description and the accompanying drawings.

DETAILED DESCRIPTION

Figure 1:
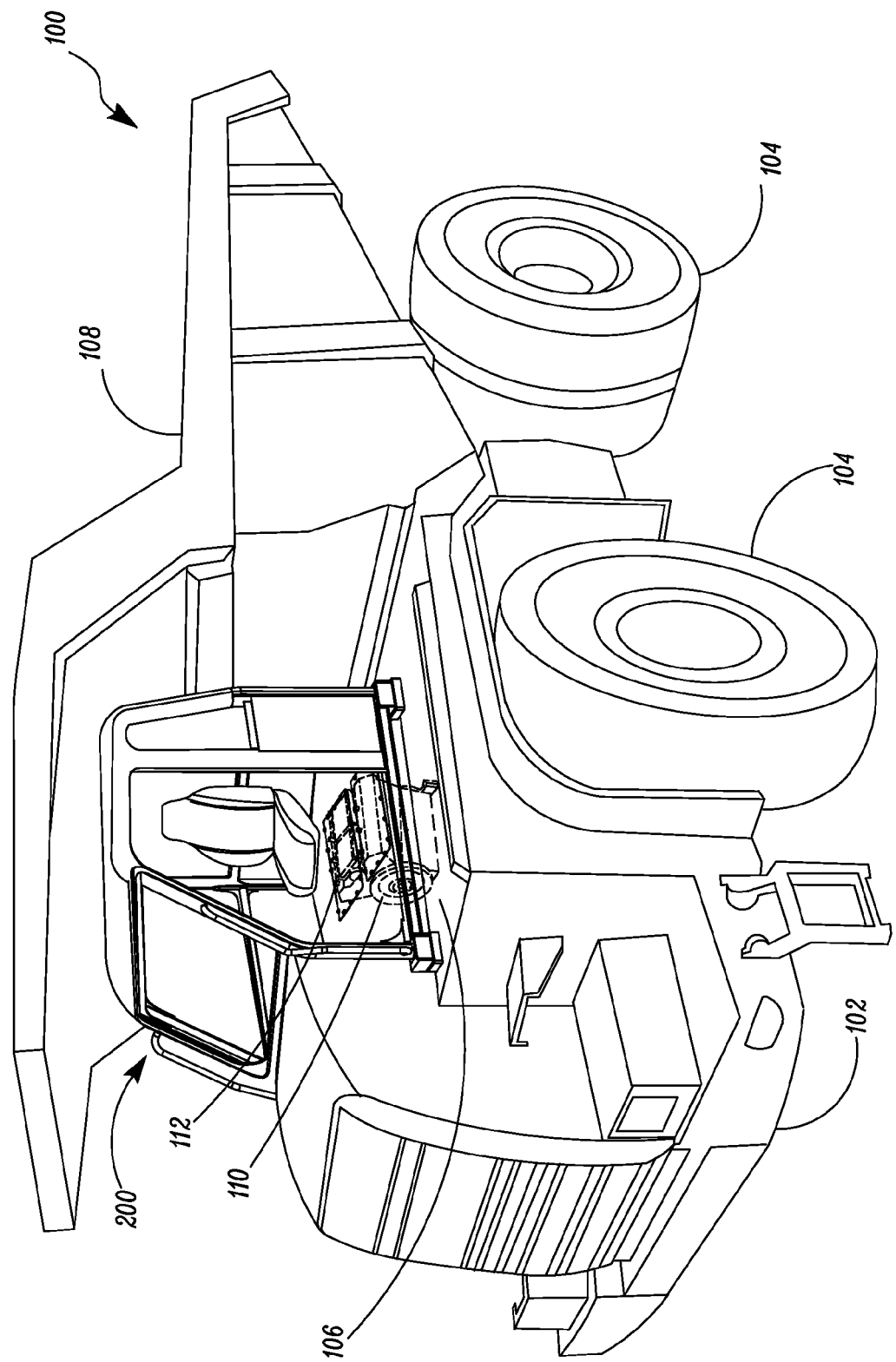
FIG. 1 illustrates a perspective view of a machine with a cab.

A machine 100 in which disclosed embodiments may be implemented is diagrammatically illustrated in FIG. 1. In an embodiment of the present disclosure, the machine 100 may be a cab-over-engine machine, for example, a compactor, a loader, a truck, a tractor, or the like. As illustrated in FIG. 1, the machine 100 is a wheeled vehicle and includes a chassis 102, wheels 104, an engine compartment 106, and a dump body 108. The machine 100 may further include an engine 110 positioned in the engine compartment 106 and supported on the chassis 102. The engine 110 may be an internal combustion engine, for example, a petrol engine, a diesel engine, or a gas powered engine.

The engine 110 includes serviceable components 112 which may need to be accessed for servicing to ensure appropriate operation of the engine 110. The engine 110 may be placed in the machine 100 in a manner such that the serviceable components 112 are accessible to an operator. In various embodiments, the serviceable components 112 may include valves which require adjustment, an engine oil opening for refilling of the engine oil, an oil dipstick for measuring the level of oil or the like.

In the illustrated embodiment, a cab 200 is mounted on a front end of the chassis 102 of the machine 100. The cab 200 may be disposed above the engine 110 and extend rearwardly beyond the engine 110. In some embodiments, the cab 200 may enclose the engine 110 by forming a portion of the engine compartment 106. In other embodiments, the cab 200 may be pivotally mounted to the chassis 102, such that the cab 200 may be tilted to provide an access to the engine 110.

Figure 2:
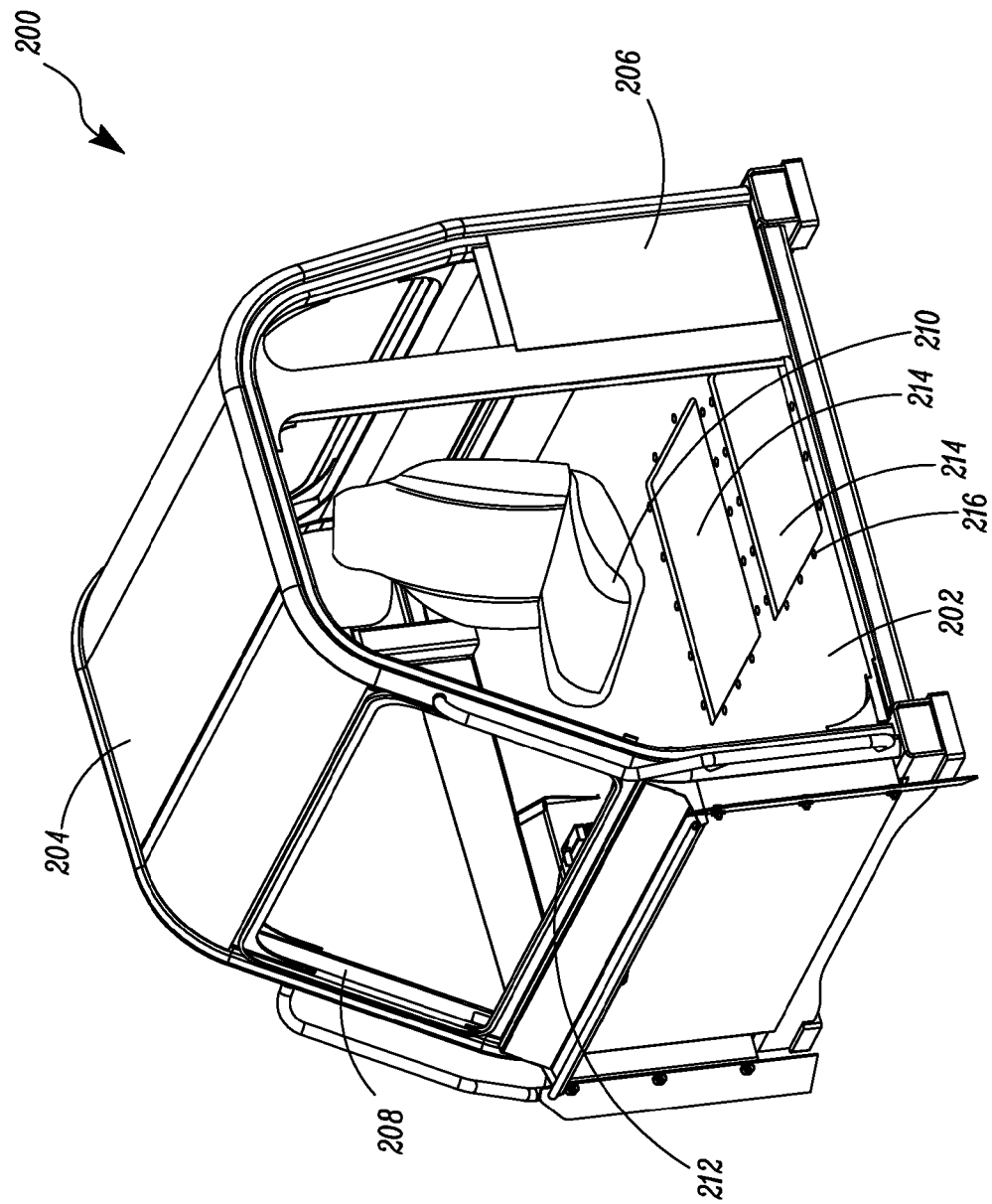
FIG. 2 illustrates a perspective view of the cab with floor openings.

Referring now to FIG. 2, the cab 200 may include a floor 202 and a roof 204. The cab 200 may further include side-walls 206 extending from the floor 202 to the roof 204 to define an enclosure. The side-walls 206 may form a frame 208 to support a door, a window pane, and other components of the cab 200. The floor 202, the roof 204 and the side-walls 206 of the cab 200 may be made of sheet metal and joined together with rivets or bolts. The roof 204 and the side-walls 206 may be provided with a lining of an insulating material from the inside.

The cab 200 may further include a seat 210, an instrument cluster 212 and various other components to provide an operative environment. The seat 210 may be supported on the floor 202 and ergonomically positioned in relation to the instrument cluster 212. In an embodiment, the seat 210 may be movable to provide access to some portions of the floor 202 in the cab 200.

In FIG. 2, it may be apparent that the floor 202 may be disposed above the engine 110 (not illustrated in FIG. 2). The floor 202 may have a floor opening 214, such that the floor opening 214 may define a cut-out portion in the floor 202. The floor opening 214 may be formed while manufacturing the floor 202 or may be cut out from the floor 202. In an embodiment, the cab 200 may include a plurality of floor openings 214 provided in the floor 202. In the illustrated embodiment, the cab 200 includes two floor openings 214.

The floor opening 214 may be positioned relative to the serviceable components 112 of the engine 110 disposed under the floor 202. The floor opening 214 may be positioned such that the serviceable components 112 are accessible from the cab 200. In an embodiment, the floor opening 214 may be provided above the serviceable components 112. It may be apparent to those skilled in the art that, the layout of the floor 202 and the positioning of the floor opening 214 may vary depending on the space constraints in the cab 200. In an embodiment, the floor opening 214 may lie below the seat 210. The floor 202 may also include a plurality of holes 216 disposed along a periphery of the floor opening 214.

Figure 3:
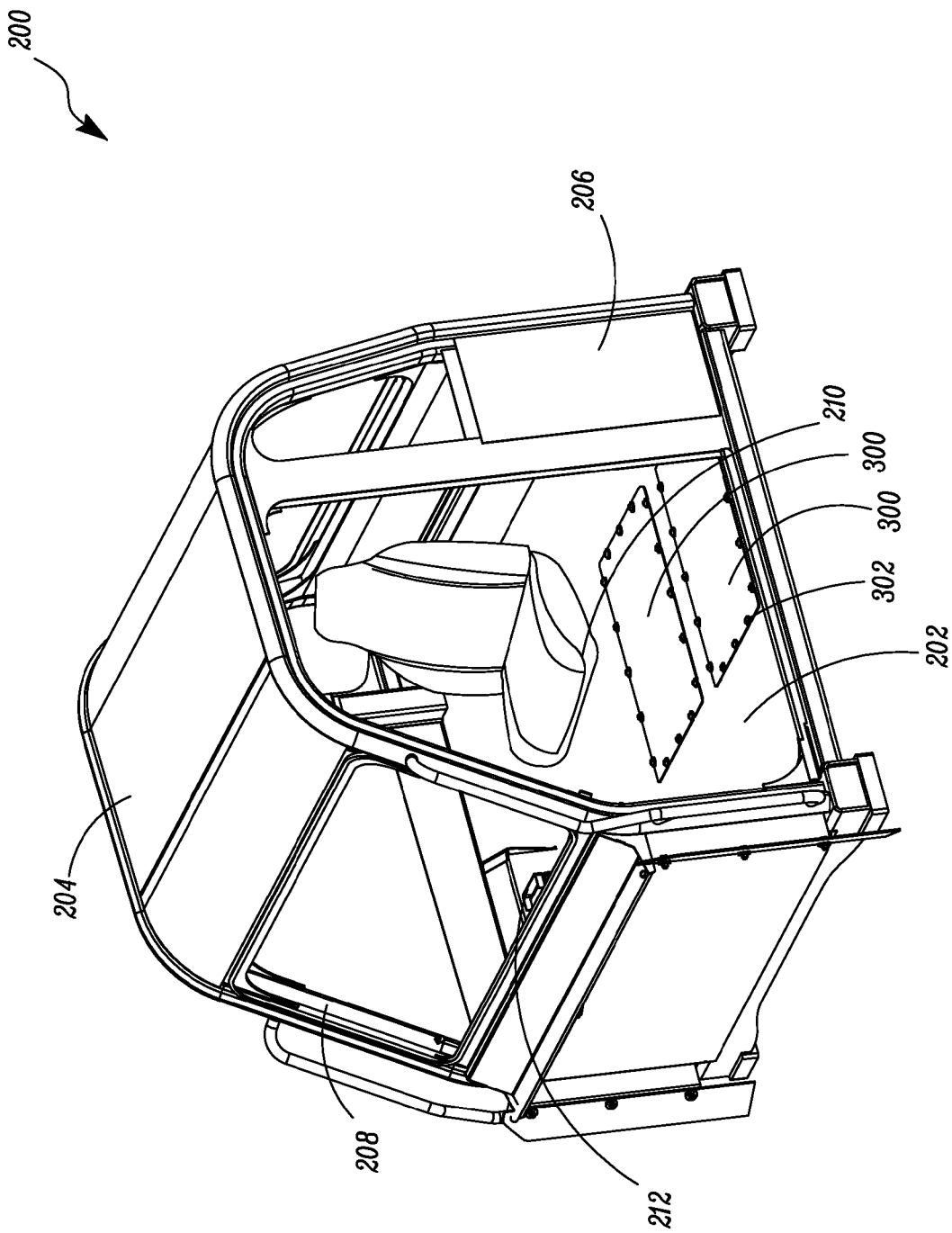
FIG. 3 illustrates a perspective view of the cab with the access panels.

FIG. 3 illustrates the cab 200 including an access panel 300 disposed on the floor 202. In an exemplary embodiment illustrated in FIG. 3, the cab 200 includes two access panels 300 disposed on the floor 202. It may be contemplated, however, that the cab 200 may include a plurality of access panels 300. The access panels 300 may be coupled to the floor opening 214 (as illustrated in FIG. 2) in the cab 200. Specifically, the access panels 300 are removably coupled to the floor opening 214. The access panels 300 may be placed over the floor opening 214 in the cab 200 to cover the floor opening 214.

In an embodiment, the access panel 300 may be fixedly coupled to the floor 102 using fastening members 302 which may include, but not limited to, bolts or the like. The holes 216 (as illustrated in FIG. 2) may be provided with internal threads to receive the fastening members 302. The access panel 300 may be removed using suitable tools such as a screwdriver or the like based on the fastening members 302.

Figures 4, 5:
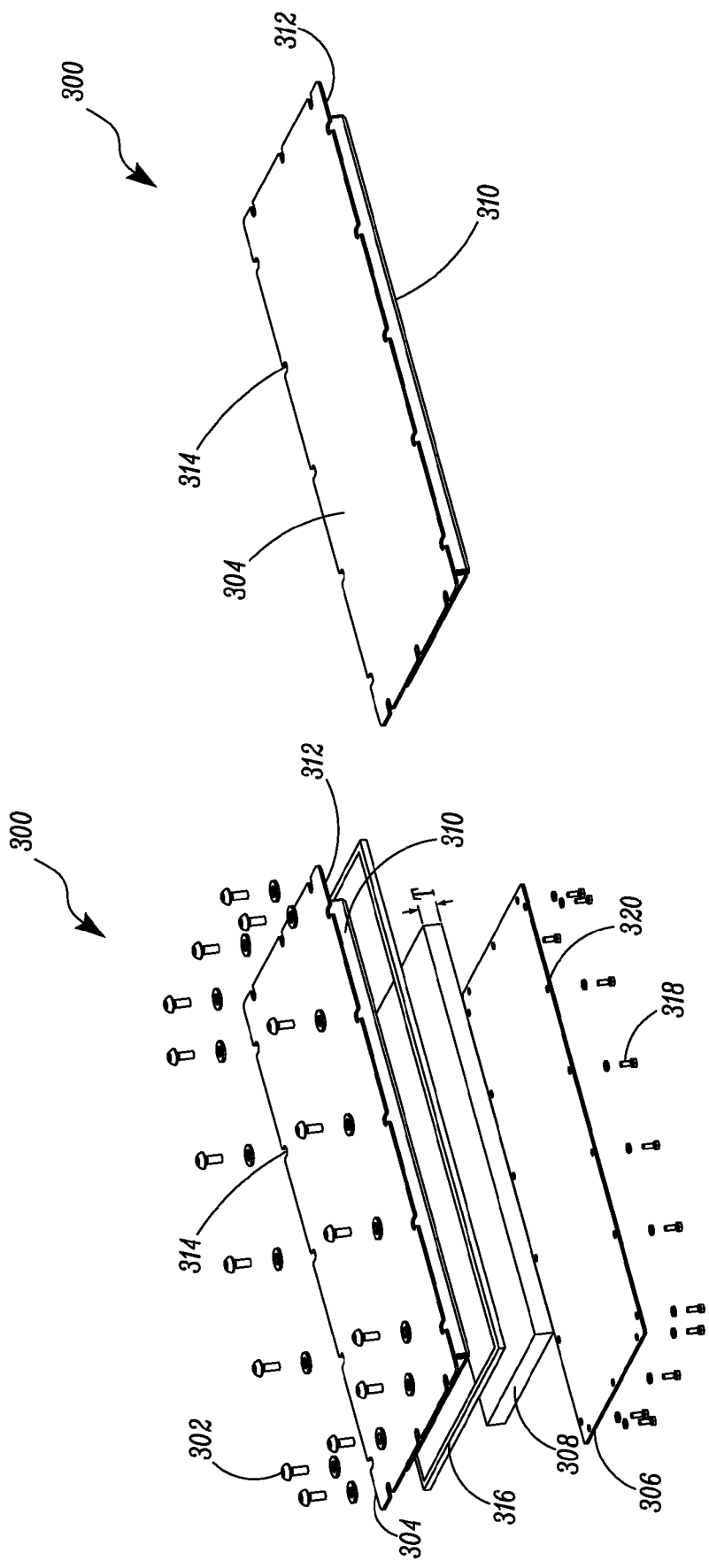
FIG. 4 illustrates an exploded view of the access panel.
FIG. 5 illustrates an assembled view of the access panel.

FIG. 4 illustrates the access panel 300 in an exploded view. The access panel 300 may include a plurality of members disposed over each other, each member configured to for different function. In an embodiment, the access panel 300 includes a first member 304, a second member 306, and a third member 308. The first member 304 and the second member 306 may have a rigid structure, made of material like sheet metal, composites or the like. The third member 308 may have a substantially rigid structure and is disposed between the first member 304 and the second member 306 in the access panel 300.

In an embodiment, the first member 304 may be larger compared to the second member 306 or the third member 308. The first member 304 may further include a pocket 310 provided in the shape of the third member 308. The pocket 310 receives the third member 308 therein, and allows the third member 308 to couple with the first member 304. The second member 306 couples with the first member 304 conforming to the pocket 310.

Further, in an embodiment, a peripheral portion of the first member 304 may extend to form a flange 312. The first member 304 may include a plurality of slots 314 disposed in the flange 312. The fastening members 302 may pass through the slots 314 in the flange 312 and holes 216 in the floor 202 to fixedly couple the access panel 300 to the floor 202. In one embodiment, the access panel 300 may further include a sealing unit 316 provided in the space between the access panel 300 and the floor 202. The sealing unit 316 may include a rubber gasket lining the flange 312 in the first member 304.

In an embodiment, the first member 304 and the second member 306 are coupled by clamping members 318, providing a rigid structure to the access panel 300. Specifically, the first member 304 and the second member 306 are coupled with the third member 308 disposed in between the first member 304 and the second member 306. The clamping members 318 may include rivets running through a plurality of apertures 320 in the second member 306 and corresponding apertures (not illustrated) provided in the walls of the pocket 310 of the first member 304.

The access panel 300 may have sound absorbing characteristics to insulate the cab from the noise of the engine 110 below the floor 202. The third member 308 may be composed of a sound absorbing material, such as mineral wool, glass wool, foam or the like. In an embodiment, the third member 308 is composed of bonded foam such as polyurethane foam. Alternatively, the third member 308 may have micro-perforations in the structure which provide the third member 308 with sound absorbing characteristics. Further in an embodiment, the third member 308 may include layers of material like plastic, wood, etc to provide thermal insulation to the cab 200 from the engine 110.

FIG. 5 illustrates the access panel 300 in an assembled state. The access panel 300 may be of similar thickness as the floor 202. The access panel 300 may be conformed to adapt to the shape of the floor opening 214 such that the access panel 300 couple with the floor 202 over the floor opening 214. The access panel 300 may be of any suitable shape such as, for example, circular, rectangular, hexagonal, etc. In an embodiment, the access panel 300 may have a rectangular shape which facilitates the coupling of the access panel 300 to the floor opening 214 in the cab 200. Further, the rectangular shape may facilitate manufacturing of the access panel 300 in a more cost effective manner.

Industrial Applicability

In the illustrated embodiments, the machine 100 is a cab-over-engine machine. The engine 110 is situated under the floor 202 of the cab 200 and may be difficult to access. However, the engine 110 may need to be accessed for servicing of serviceable components 112. To access the engine 110, the cab 200 may be removed or tilted about the chassis 102 of the machine 100.

To minimize the need of removing or tilting the cab 200 for servicing, the floor 202 is provided with the floor opening 214. The floor opening 214 provides access to the serviceable components 112, positioned below the floor opening 214. In an exemplary embodiment, the floor opening 214 is disposed above the engine valve, such that the engine valve may be accessed through the floor opening 214 for adjustment.

Further to provide a rigid structure to the floor 202, the access panel 300 may be disposed over the floor opening 214. The access panel 300 may cover the floor opening 214 to provide a continuum to the floor 202. In an embodiment, the access panel 300 may be received on the floor opening 214, such that the access panel 300 is supported on the floor 202 by the flange 312. The fastening members 302 may secure the access panel 300 to the floor 202 in a manner such that the access panel 300 is easily removable for servicing. The operator may need to unfasten the fastening members 302 from the holes 216 and the slots 314 to remove the access panel 300.

Whenever the engine 110 requires servicing, the operator may remove the access panel 300 to access the serviceable components 112 through the floor opening 214. The operator may reach the serviceable components 112 directly from the cab 200, without need of tilting or stepping outside the cab 200. It may be apparent that, when the floor opening 214 and correspondingly the access panel 300 are disposed below the seat 210 in the cab 200, the seat 210 is first moved to reach the access panel 300, and then the access panel 300 is removed to access the serviceable components 112.

Due to the floor opening 214 being situated above the engine 110, some noise may creep in the cab 200 during the operation of the engine 110. To provide the cab 200 with sound insulation, the access panel 300 includes the third member 308 having a sound absorbing material which may prevent some unwanted noises from the engine 110 to reach the cab 200. In an embodiment, to provide an effective sound absorbing characteristic to the third member 308, a composite of bonded foam with density of about 160 kg/m$^3$ may be used as the sound absorbing material Further, the third member 308 may have a thickness "T" in a range from 20 mm to 35 mm. Further in an embodiment, the third member 308 may also provide thermal insulation to the cab 200 by absorbing heat from the engine 110.

The cab 200 may also encounter vibrations induced from the engine 110. In particular, the access panel 300 being coupled to the floor 202 may be more prone to the vibrations. The sealing unit 316 disposed in the space between the floor 202 and the access panel 300 may absorb some vibrations induced from the engine 110 by acting as a dampening member.

Although the embodiments of this disclosure as described herein may be incorporated without departing from the scope of the following claims, it will be apparent to those skilled in the art that various modifications and variations can be made. Other embodiments will be apparent from consideration of the specification and practice of the disclosure. It is intended that the specification and examples be considered as exemplary only, with a true scope being indicated by the following claims and their equivalents.

What is claimed is:

1. A machine comprising:
   a chassis;
   an engine supported on the chassis, the engine including a serviceable component;
   a cab mounted on the chassis, the cab including a floor disposed above the engine, the floor having a floor opening; and
   an access panel removably coupled to the floor opening, wherein the access panel includes a first member including a flange, a second member, a third member disposed between the first member and the second member, and clamping members to couple the first member and the second member with the third member in between the first member and the second member.

2. The machine of claim 1, wherein the cab further includes:
   a roof; and
   at least two side-walls extending from the floor to the roof to define a frame.

3. The machine of claim 1, wherein the floor opening is positioned relative to the serviceable component to provide access to the serviceable component.

4. The machine of claim 1, wherein the access panel further includes a sealing unit.

5. The machine of claim 1, wherein the access panel covers the floor opening to provide a rigid structure to the floor, and wherein the access panel is supported on the floor by the flange.

6. The machine of claim 5, wherein the access panel is fixedly coupled to the floor opening by fastening members.

7. The machine of claim 5, wherein the third member is composed of bonded foam having sound absorbing properties.

8. A cab for a machine, the cab comprising:
   a roof;
   a floor including a floor opening;
   at least two side-walls extending from the floor to the roof to define a frame; and
   an access panel removably coupled to the floor opening, wherein the access panel includes a first member including a flange, a second member, a third member disposed between the first member and the second member, and clamping members to couple the first member and the second member with the third member in between the first member and the second member.

9. The cab of claim 8, wherein the cab is disposed over an engine in the machine, the engine including a serviceable component.

10. The cab of claim 8, wherein the access panel further includes a sealing unit.

11. The cab of claim 8, wherein the access panel covers the floor opening to provide a rigid structure to the floor, and wherein the access panel is supported on the floor by the flange.

12. The cab of claim 11, wherein the access panel is fixedly coupled to the floor by fastening members.

13. The cab of claim 8, wherein the third member is composed of bonded foam having sound absorbing properties.

14. An access panel for a floor of a machine, the access panel comprising:
   a first member including a flange;
   a second member;
   a third member disposed between the first member and the second member, wherein the first member is larger compared to the second member and the third member, and wherein the first member includes a pocket to receive the third member.

15. The access panel of claim 14, wherein the third member is composed of bonded foam having sound absorbing properties.

16. The access panel of claim 14, wherein the second member couples with the first member conforming to the shape of the pocket.

* * * * *